W. RODECK.
COMBINATION MEASURING INSTRUMENT.
APPLICATION FILED MAR. 23, 1915.
1,172,050.
Patented Feb. 15, 1916.
2 SHEETS—SHEET 2.
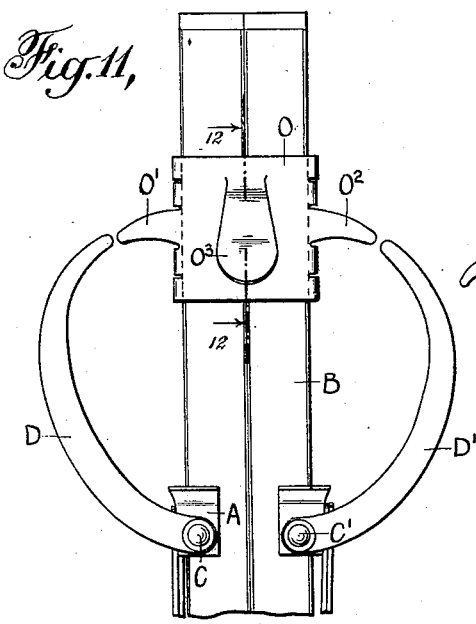
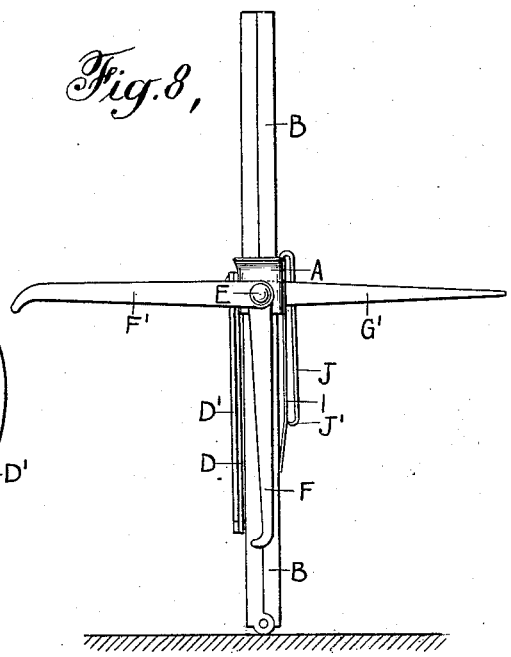
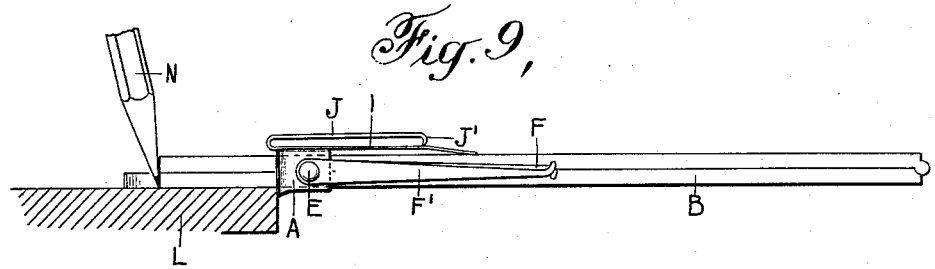
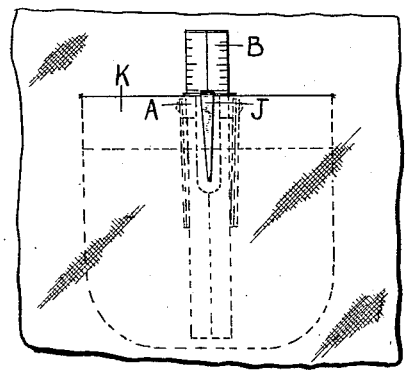
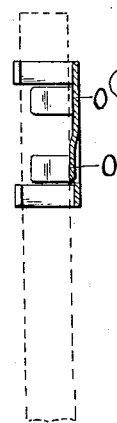
WITNESSES
INVENTOR
Walter Rodeck
BY
ATTORNEYS
THE COLUMBIA PLANOGRAPH CO., WASHINGTON, D. C.

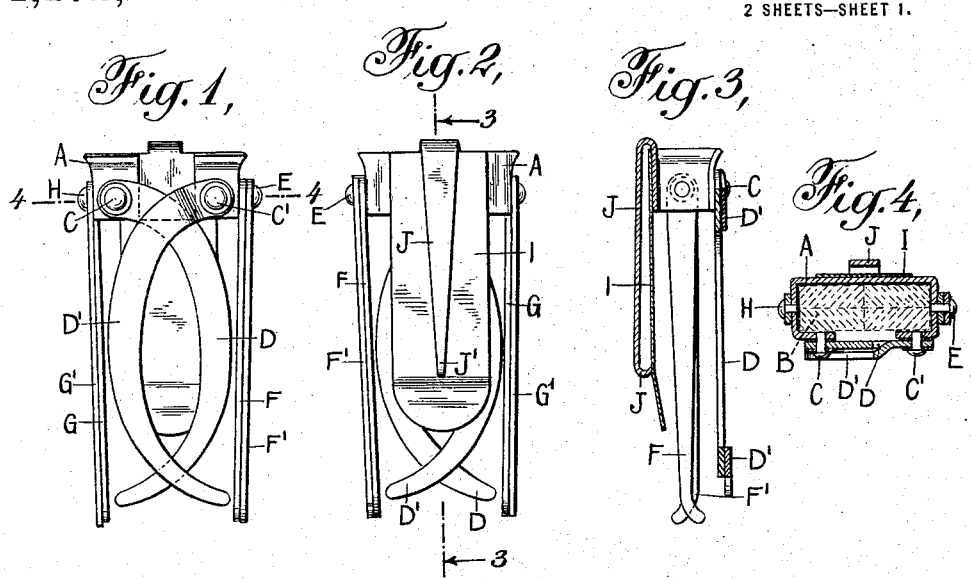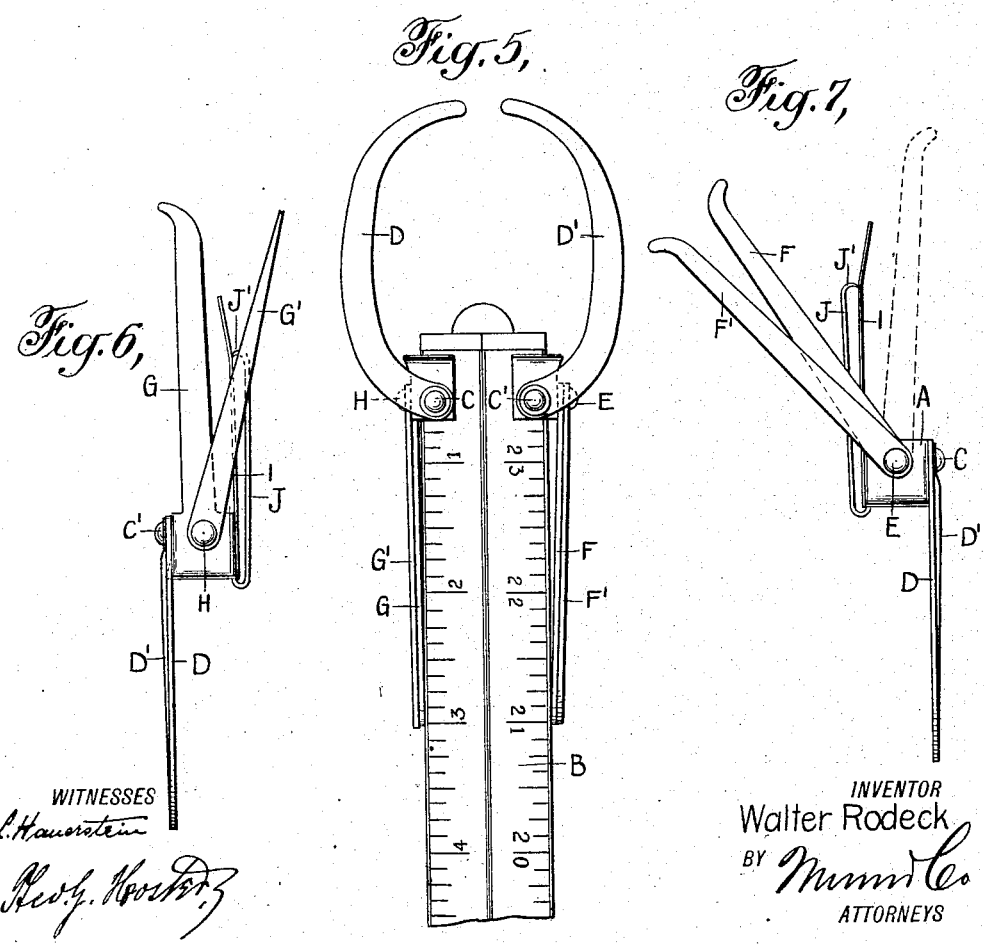

UNITED STATES PATENT OFFICE.

WALTER RODECK, OF NEW DURHAM, NEW JERSEY.

COMBINATION MEASURING INSTRUMENT.

1,172,050.   Specification of Letters Patent.   Patented Feb. 15, 1916.

Application filed March 23, 1915. Serial No. 16,347.

*To all whom it may concern:*

Be it known that I, WALTER RODECK, a citizen of the United States, and a resident of New Durham, in the county of Hudson and State of New Jersey, have invented a new and Improved Combination Measuring Instrument, of which the following is a full, clear, and exact description.

The object of the invention is to provide a new and improved combination measuring instrument for use in conjunction with an ordinary two-foot folding rule, and arranged to be used as an inside caliper or an outside caliper, or a hermaphrodite caliper, or a surface gage, or a scriber, and adapted for convenient attachment to a pocket to form a safety holder for the rule.

In order to accomplish the desired result, use is made of a sleeve or a ferrule adapted to slip exteriorly on an ordinary carpenter's rule, a variety of calipers having their arms on the sides and front of the said sleeve to permit of individual use of any one of the calipers. Use is also made of a spring tongue on the back of the sleeve and adapted to bear on the rule to hold the sleeve in adjusted position on the rule, and a clip arm on the back of the sleeve and operating in conjunction with the said spring tongue to hold the measuring instrument in position on a pocket and for holding the rule safely in position when the rule is not in use.

A practical embodiment of the invention is represented in the accompanying drawings forming a part of this specification, in which similar characters of reference indicate corresponding parts in all the views.

Figure 1 is a front elevation of the combination measuring instrument; Fig. 2 is a rear elevation of the same; Fig. 3 is a cross section of the same on the line 3—3 of Fig. 2; Fig. 4 is a sectional plan view of the same on the line 4—4 of Fig. 1; Fig. 5 is a front elevation of the measuring instrument as attached to an ordinary two-foot carpenter's rule and with the outside caliper in position for measuring; Fig. 6 is an elevation of one side of the measuring instrument with the hermaphrodite caliper in position for use; Fig. 7 is a similar view of the measuring instrument with the inside caliper in position for use; Fig. 8 is a side elevation of the measuring instrument in position on a carpenter's rule and with the parts in position for use as a surface gage; Fig. 9 is a similar view of the same with the parts in position for use as a scratch gage; Fig. 10 is a reduced elevation of the measuring instrument shown attached to a pocket to form a safety holder for a carpenter's rule; Fig. 11 is a front elevation of the measuring instrument in position on a carpenter's rule and arranged in conjunction with a double pointer for use as a double outside caliper; and Fig. 12 is a cross section of the double pointer on the line 12—12 of Fig. 11.

The measuring devices of the instrument are mounted on a sleeve or ferrule A approximately of rectangular shape and preferably split at the front, as indicated in Fig. 4, the opening of the ferrule being of a size to snugly fit exteriorly onto an ordinary two-foot folding carpenter's rule B, as plainly indicated in Figs. 5, 8, 9, 10 and 11. On the front of the ferrule A are arranged spaced pivots C, C' on which are mounted to swing curved arms D, D' constituting an outside caliper when swung into open position, as shown in Fig. 5, with the ferrule A located at one end of the rule B to permit of using the latter as a handle for conveniently manipulating the outside caliper. It will be noticed that when the arms D and D' are in the folded position, as shown in Fig. 1, they lie within the width of the sleeve A and consequently within the width of the rule B when folded as shown in Fig. 4. For the purpose mentioned the arm D' is slightly offset near its pivotal end to allow the other arm D to pass under it, as will be readily understood by reference to Fig. 1.

On the right-hand side of the sleeve A is arranged a pivot E on which are mounted to swing the arms F, F' of an inside caliper, as will be readily understood by reference to Fig. 7. On the other side of the ferrule A is arranged a hermaphrodite caliper having arms G, G', of which the arm G forms an integral extension of the left side of the ferrule A while the other arm G' is mounted to swing on a pivot H held on this side of the ferrule A. The arm G' can be readily swung outward relative to the arm G to permit of using the arms G and G' as a hermaphrodite caliper, as will be readily understood by reference to Fig. 6.

The back of the ferrule A is provided with an integral spring tongue I adapted to bear on the rule B so as to hold the combination measuring instrument in any adjusted position on the rule B. A clip arm J is also integrally connected with the upper end of the back of the sleeve A and its point J' overlies the spring tongue I near the free end thereof so as to permit of fastening the combination measuring instrument to a pocket, as shown in Fig. 10, with the clip J extending outside of the pocket K and the measuring instrument extending within the pocket K to form a safety holder for the rule B.

The measuring instrument may be used in conjunction with the rule B as a surface gage by using the arm F' of the inside caliper or the arm G' of the hermaphrodite caliper, as shown in Fig. 8.

The measuring instrument may also be used in conjunction with the rule B as a scratch gage, as shown in Fig. 9, it being understood that in this case one edge of the sleeve A abuts against the edge of the work L while a pencil or a like tool N is used on the end of the rule B for making the desired mark on the face of the work L. The mouth of the sleeve A is preferably made to flare outward so as to allow convenient slipping of the sleeve into position on the rule and to form an abutment for abutting the sleeve against the work L, as will be readily understood by reference to Fig. 9.

The measuring instrument may also be used as a double outside gage, and for this purpose use is made of a double pointer in the form of a sleeve or a ferrule O slidable on the rule B the same as the sleeve A and provided on opposite sides with points O', O² adapted to operate in conjunction with the arms D, D' of the outside caliper, as will be readily understood by reference to Fig. 11. The sleeve O is provided with a spring tongue O³ adapted to bear on the rule B to hold the double pointer in adjusted position on the rule.

The combination measuring instrument may be used for calipering purposes without the rule B, if it is desired to do so, but when the measuring instrument is in position on the rule the latter forms a convenient handle for manipulating the instrument. The arms F, F' and G, G' extend slightly inward so that when the measuring instrument is engaged with the rule B then the free ends of the innermost arms F and G bear against the sides of the rule to assist the spring tongue I in holding the measuring instrument in adjusted position.

Having thus described my invention, I claim as new and desire to secure by Letters Patent:

1. A measuring instrument, comprising in combination, an ordinary rule, a sleeve slidable thereon, an outside caliper comprising a pair of arms pivoted on the front of the said sleeve, an inside caliper comprising a pair of arms, said last mentioned arms being fulcrumed on one side of the said sleeve, and a hermaphrodite caliper comprising a pair of members, one member forming an integral extension of the other side of the sleeve and the other member being fulcrumed on the said other sleeve side, the free ends of the inner and hermaphrodite caliper members frictionally engaging the sides of the rule.

2. A measuring instrument, comprising in combination, an ordinary rule, a sleeve slidable thereon, an outside caliper comprising a pair of arms, said arms being pivoted on the front of the said sleeve, an inside caliper comprising a pair of arms fulcrumed on one side of the said sleeve, a hermaphrodite caliper comprising a pair of members, one member forming an integral extension of the other side of the sleeve and the other member being fulcrumed on the said other sleeve side, the free ends of said inner and hermaphrodite caliper members frictionally engaging the sides of the rule, and a spring tongue on the back of the sleeve and adapted to bear on the rule in position in the sleeve.

3. A measuring instrument, comprising in combination, an ordinary rule, a sleeve slidable thereon, an outside caliper comprising a pair of arms, said arms being pivoted on the front of the said sleeve, an inside caliper having its arms fulcrumed on one side of the said sleeve, a hermaphrodite caliper comprising a pair of members, one member forming an integral extension of the other side of the sleeve and the other member being fulcrumed on the said other sleeve side, the free ends of the inside and hermaphrodite caliper members frictionally engaging the sides of the rule, a spring tongue on the back of the sleeve and adapted to bear on the rule in position in the sleeve, and a clip arm extending integrally from the back of the sleeve overlying the said spring tongue to form with the latter a clamp for engagement with a pocket.

4. In combination with an ordinary rule, a sleeve slidable on the said rule, an outside caliper comprising a pair of arms, said arms being fulcrumed on the front of the said sleeve, and a pointer slidable on the said rule and having two points extending in opposite directions from the sides of the pointer, the said points operating in conjunction with the terminals of the said caliper arms to form a double outside caliper.

In testimony whereof I have signed my name to this specification in the presence of two subscribing witnesses.

WALTER RODECK.

Witnesses:
THOS. W. WATSON,
WILLIAM MORRIS.

Copies of this patent may be obtained for five cents each, by addressing the "Commissioner of Patents, Washington, D. C."